United States Patent [19]

Rigazio

[11] 4,097,757

[45] Jun. 27, 1978

[54] SYNCHRONOUS MOTOR

[75] Inventor: Anthony W. Rigazio, Oglesby, Ill.

[73] Assignee: General Time Corporation, Thomaston, Conn.

[21] Appl. No.: 659,108

[22] Filed: Feb. 18, 1976

[51] Int. Cl.² .......................................... H02K 21/00
[52] U.S. Cl. ..................................... 310/162; 310/156
[58] Field of Search ................. 310/40 MM, 162, 168, 310/163, 91, 164, 254, 49, 156, 268, 43, 261, 89, 268; 58/23 R, 23 D, 23 BA

[56] References Cited

U.S. PATENT DOCUMENTS

| | | | |
|---|---|---|---|
| 3,256,453 | 6/1966 | Haydon | 310/163 |
| 3,432,735 | 3/1969 | Petrides | 310/162 |
| 3,461,663 | 8/1969 | Albinger | 58/23 BA |
| 3,583,148 | 7/1971 | Wolber | 58/23 BA |
| 3,626,263 | 12/1971 | McBride | 310/49 |
| 3,818,690 | 7/1974 | Swarzschild | 58/23 D |
| 3,855,490 | 12/1974 | Sidell | 310/162 |
| 3,878,414 | 4/1975 | Harakawa | 310/162 |
| 3,883,753 | 5/1975 | Lechner | 310/162 |
| 3,946,259 | 3/1976 | McBride | 310/49 |

Primary Examiner—R. Skudy
Attorney, Agent, or Firm—Pennie & Edmonds

[57] ABSTRACT

A synchronous motor includes a disc-shaped rotor, a one-piece stator, and a coil assembly including a core and a winding therearound. The stator is connected to one end of the core and includes a pair of legs, the ends of which extend along an arcuate length thereby to define stator pole faces spaced from and concentric with the axis of rotation of the rotor. The rotor is magnetized radially and presents a plurality of contiguous substantially equally sized magnetic poles of alternating polarity at an air gap. The magnetic poles are of an angular length greater than the length of the stator pole faces. The motor is received by a molded casing providing means both for locating the stator pole faces and the rotor within the stator field at the air gap. The core provides an additional stator pole face in the magnetic field of the rotor and the winding of the motor is energized either by an A.C. or a D.C. source.

15 Claims, 11 Drawing Figures

U.S. Patent  June 27, 1978  Sheet 1 of 5  4,097,757
FIG.1.
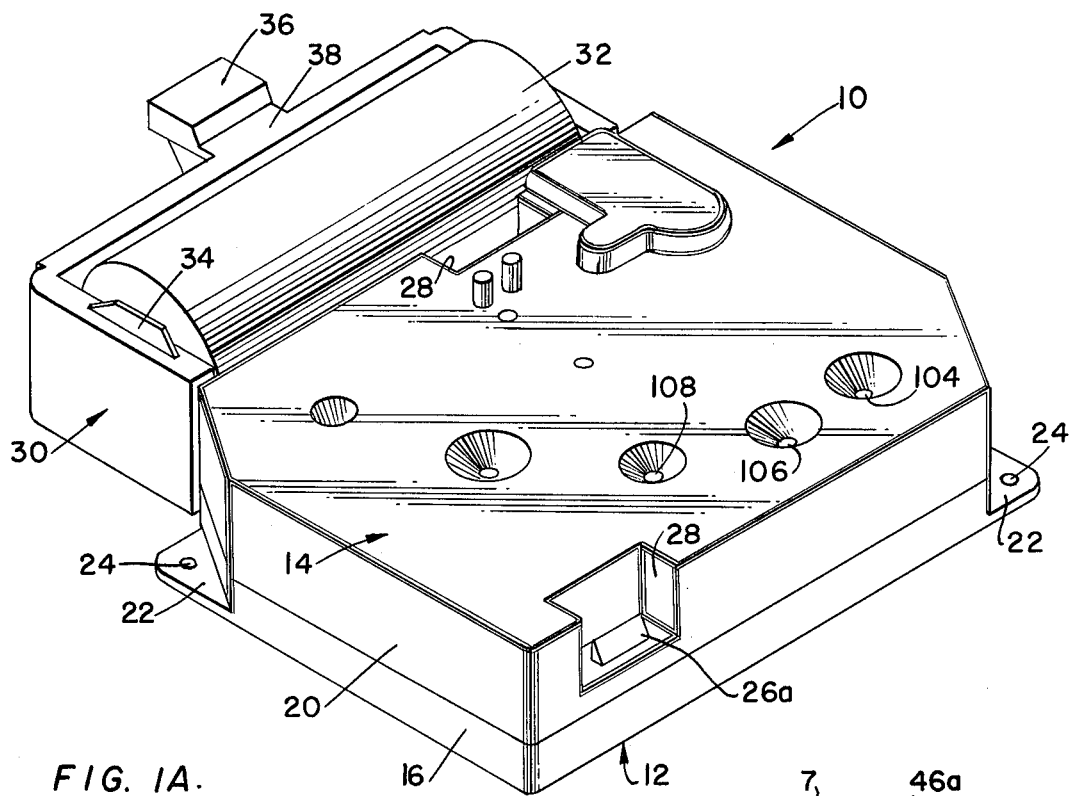
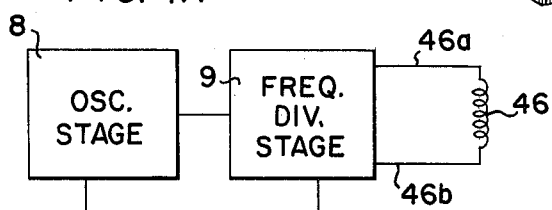
FIG.1A.
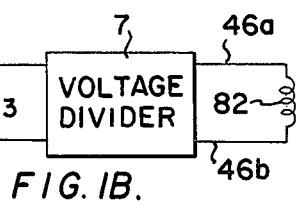
FIG.1B.
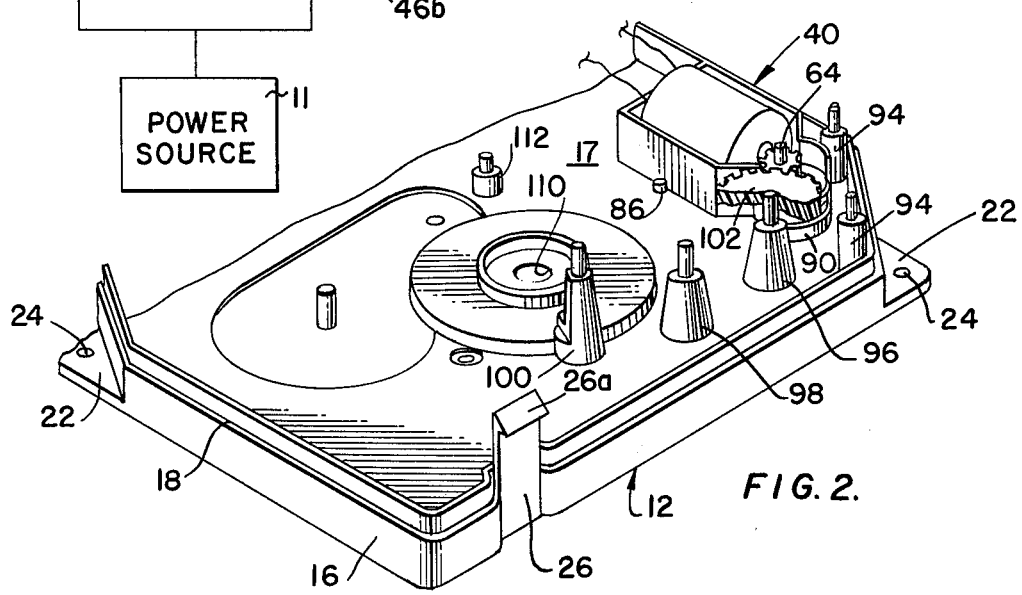
FIG.2.

SYNCHRONOUS MOTOR

BRIEF STATEMENT OF THE INVENTION

The present invention is in a new and improved synchronous motor having either an A.C. or a D.C. energizing source. Particularly, the motor includes a rotor which is of a disc-shaped outline, a stator of one-piece construction having a pair of legs extending toward the rotor and a coil assembly including a core and a winding carried thereon. The stator is connected to one end of the core while the legs define a pair of pole faces at their ends. The pole faces are disposed at an air gap which is radially concentric with the axis of rotation of the rotor. The rotor, thus located in the stator field, includes a plurality of poles having equiangular working surfaces which are magnetized radially. The working surfaces of the magnetic poles are of a length greater than the length of the stator poles. The core of the energizing assembly extends toward the magnetic working surface and defines an additional stator pole in the magnetic field of the rotor.

The invention, also, is directed to the combination of the above motor and a molded casing having structure for physically locating the stator poles and the rotor of the motor at the air gap without necessary resort to critical adjustment of the rotor location in the field of the stator poles. To this end, the casing provides a slot which is radially concentric to a shaft supported along the axis of a hub. The stator poles are received in the slot and the rotor is slidably received on the shaft for movement in accordance with the energization of the winding.

The motor generally described above and more particularly described below is of relatively simple construction in that it comprises only a few components. Yet the motor provides good efficiency and through ease of fabrication of components and their assembly in a casing the motor may be supplied to the clock industry with low manufacturing cost.

DESCRIPTION OF THE DRAWINGS

FIG. 1 is a perspective view of a form of casing for the motor of the present invention;

FIGS. 1A and 1B are block diagrams of circuits for providing a source of current suitable for energization of the motors of the present invention;

FIG. 2 is a view similar to FIG. 1 with one casing plate removed, illustrating a base of the other plate, the motor carried thereby and an arrangement of supporting structure for mounting a drive train which is driven by the motor;

DESCRIPTION OF THE PREFERRED EMBODIMENT

Figure 3:
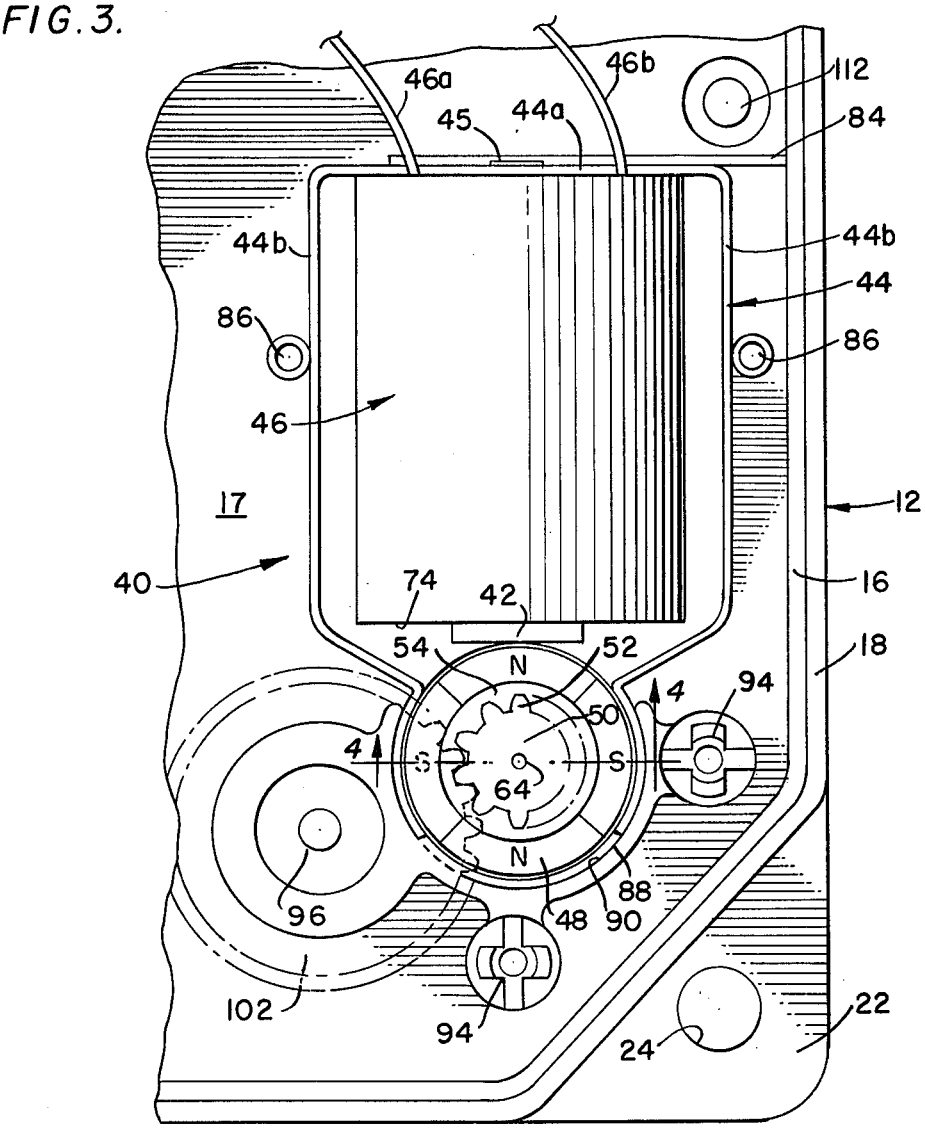
FIG. 3 is a top plan view of a portion of the plate of FIG. 2 illustrating a first form of the motor of the present invention in greater detail.

The motor of the present invention, as will be described, may derive power from either the conventional alternating current mains or from a D.C. source to provide a rotational output for driving the hands of a clock or similar horological device. Conventionally the hands are carried by a main shaft and coupled to a seconds, minutes and hour wheel driven at speeds of 1 rpm, 1 rph and 1/12 rph, respectively. The seconds wheel is mounted in driven engagement with the motor through a drive train including a plurality of reduction wheels. Any particular ratio of drive of the reduction wheels may be provided thereby to reduce the output speed of the motor to the speed discussed above. While in the preferred embodiment the output speed of the motor is 900 rpm, the motor equally as well could develop other output speeds as determined by factors such as the frequency of the current input to the winding of the stator, the number of poles of the rotor, to name two.

The first form of motor of the present invention to be discussed in conjunction with FIGS. 1A and 3–6 of the drawing is a motor whose current source may comprise a standard power cell having voltage capability as requirements of the motor dictate. To this end, the D.C. motor, as well as the electrical circuitry may be energized by a low power source of from 1.5 v to 3 v D.C.

The second form of motor of the present invention will be discussed in conjunction with FIGS. 1B and 9. This form of the motor is energized by the 60 Hz signal from the conventional alternating current mains. Means as well-known are provided in the electrical connection to the winding for purposes of voltage division so that the voltage at the winding is limited to the above range. FIG. 1B illustrates the 60Hz signal source, the winding and a voltage divider 7 electrically connected therebetween.

In the former motor the alternating input to the winding of the energizing assembly may by generated by electrical circuitry which may include an oscillator having a 4.194 MHz quartz crystal. The magnitude of oscillation is counted down by a plurality of serially arranged counter stages in the form of a flip-flop to develop an alternating 30 Hz output. The structure and circuitry described above is conventional and not shown in the drawing. Referring to FIG. 1A, there is illustrated an oscillator stage 8 and a frequency divider stage 9 formed by a plurality of serially arranged counter stages, discussed above, having an output to a winding. A power source 11, such as the aforementioned standard power cell, is arranged to supply voltage to both the oscillator stage and the frequency divider stage.

The motor of both forms is housed within a casing 10 formed by a front and back plate 12 and 14, respectively. The casing may be formed of any material, such as a plastic which exhibits characteristics such as sturdiness, good impact resistance, among others, and preferably is capable of being molded. Delrin satisfies these requirements and is preferred.

As may be seen to advantage in FIG. 2, the front plate is molded to provide a wall 16 extending upwardly around a base 17. The structure of the base 17 will be described below in conjunction with a discussion directed to the manner of mounting of the motor, for example. The wall includes an outer peripheral cut-out forming a shoulder 18, and a complementary cut-out (not shown) similarly forms a shoulder in a wall 20 of the back plate 14. These shoulders cooperate in the cut-outs when the front and back plates are joined together. The front plate, further, includes a pair of ears 22 with apertures 24 located at the base of a bevelled surface connecting opposite adjacent sides of the walls of the mating front and back plates 12 and 14, respectively.

A pair of lock tabs 26 (only one is illustrated ) extend upwardly of the base 17 for securement of the back plate 14 to the front plate 12. To this end, the back plate includes a pair of notches 28 in the wall 20. The lock tabs enter through a slot in each notch and a finger portion 26a of the lock tabs engages on the surface surrounding each slot. The back plate may be both joined with and separated from the front plate with relative ease while the front plate is secured to the clock for purposes as may be necessary. As illustrated, the lock tabs are disposed on opposite sides of the front plate, and in the mounting direction of the casing the top lock tab is seen.

A battery holder 30 may be formed with the front plate. A somewhat modified design of casing would be provided for the A.C. motor which is connected to the alternating current mains, rather than to a battery power source.

The battery holder includes a cavity for receipt of a battery 32. The battery resides between and in contact with a pair of terminals 34 (only one is illustrated). A lever 36 having a tongue (not shown) is carried by and movable about a hinge 38 comprising a portion of the wall of the battery holder. The tongue extends beneath the battery so that upon manipulation of the lever the battery may be ejected from the cavity.

The D.C. motor represented by the numeral 40 may be seen to best advantage in FIGS. 3-6 of the drawing. The motor includes generally an assembly formed by a core 42, a stator 44, a winding 46 and a rotor 48.

The stator uniquely is an element comprised of ferrous metal and formed by a single wrap including a base 44a and a pair of legs 44b which extend generally in a direction normal to the base 44a. The stator is formed to substantially surround the core and winding which comprise the coil assembly. The base 44a of the stator is staked by member 45 or otherwise secured to one end of core 42 of the coil assembly in position such that the legs 44b extend toward the axis of rotation of rotor 48. The legs terminate in a pair of stator poles 44c. The stator poles are disposed concentrically about the axis of rotor 48. In the present embodiment, the stator poles are disposed such that a plane including the axis bisects each of the poles. Thus, as illustrated in FIG. 3, the stator poles are spaced apart by an angle of about 180°.

The core 42 is a solid member and formed of a suitable material such as Armco electro magnet iron. As also illustrated in FIG. 3, the end of core 42 which faces the rotor 48 is spaced apart from the stator poles by an angle of approximately 90°. A winding is wound on the core and comprises a number of turns of wire whose ends 46a and 46b are connected to the source of energizing current. The wire, preferably, is a copper wire, and the number of turns, as well as the gauge of the wire, as well-known, are dictated by factors such as the total resistance requirements, the number of poles of the rotor, the operating voltage of the motor, among other considerations.

The D.C. motor will have winding of about 6,500 turns (1.5 v) or 14,000 turns (3 v) or #41 or #43 gauge copper wire, respectively. The A.C. motor will have a winding of 5,000 turns (115 v) of #43 gauge copper wire. The winding may be wound directly on the core or on a plastic tape carried by the core. With the latter some current loss results, therefore requiring a higher current value. The direct winding is preferred.

The rotor 48 is of disc-shaped outline and formed of a material which displays characteristics of low density and low moment of inertia. The material which may be #22-929 Koroseal, a product of the B.F. Goodrich Company, comprising barrium ferrite in a rubber binder, also is capable of being permanently magnetized. The rotor is magnetized radially in both forms of the invention by methods that are known and through radial magnetization the rotor is capable of providing a large magnetic working area and therefore may develop a high torque output.

Without any intent to limit the invention, but rather to set out specifics of a preferred construction, the D.C. motor of FIGS. 3-6 includes a rotor having an outlet diameter of 0.366 ± 0.001 inches, a thickness of 0.047 ± 0.003 inches and a pluarlity of four permanently magnetized poles arranged in quadrature about the axis of rotation. The winding is as set out above and the poles of the stator are about 60° in length thereby to cooperate with the individual poles of the rotor. And the core is spaced from the axis of the rotor by a distance of 0.1930 ± 0.0015 inches and from the peripheral surface of the rotor by a distance of about 0.010 inches. The poles of the stator are spaced from the peripheral surface of the rotor by a similar distance. The core, further, has a diameter substantially equal to the length of the stator poles.

Figure 4:
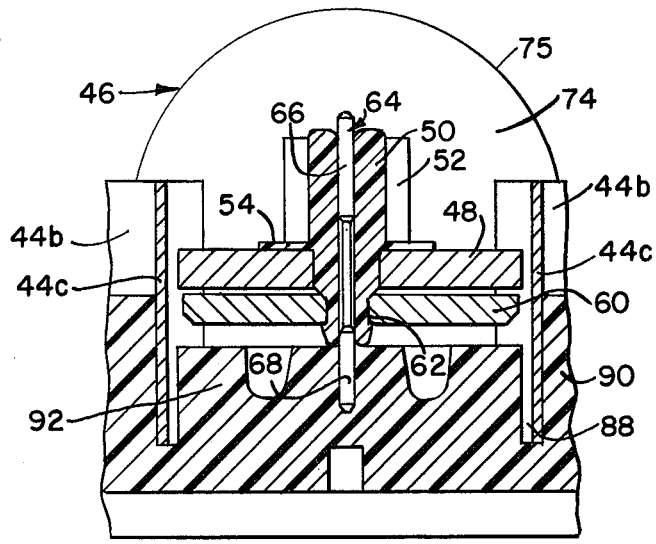
FIG. 4 is a vertical section as seen along the line 4—4 in FIG. 3.
Figure 5:
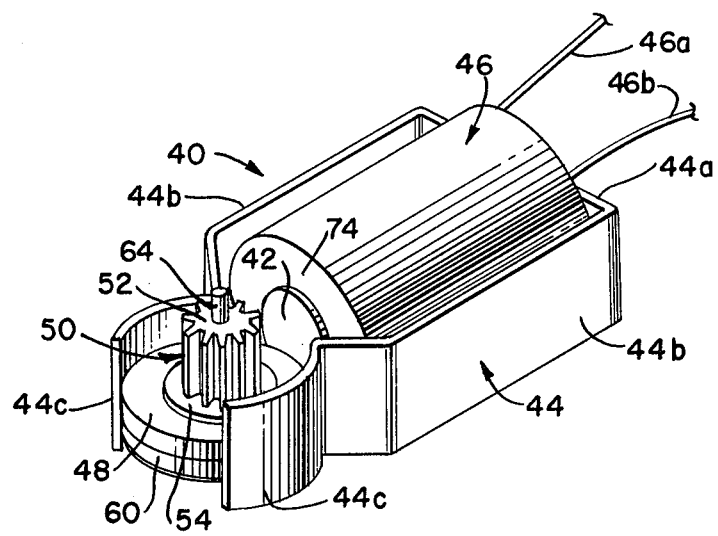
FIG. 5 is a perspective view of the motor of FIG. 3.
Figure 6:
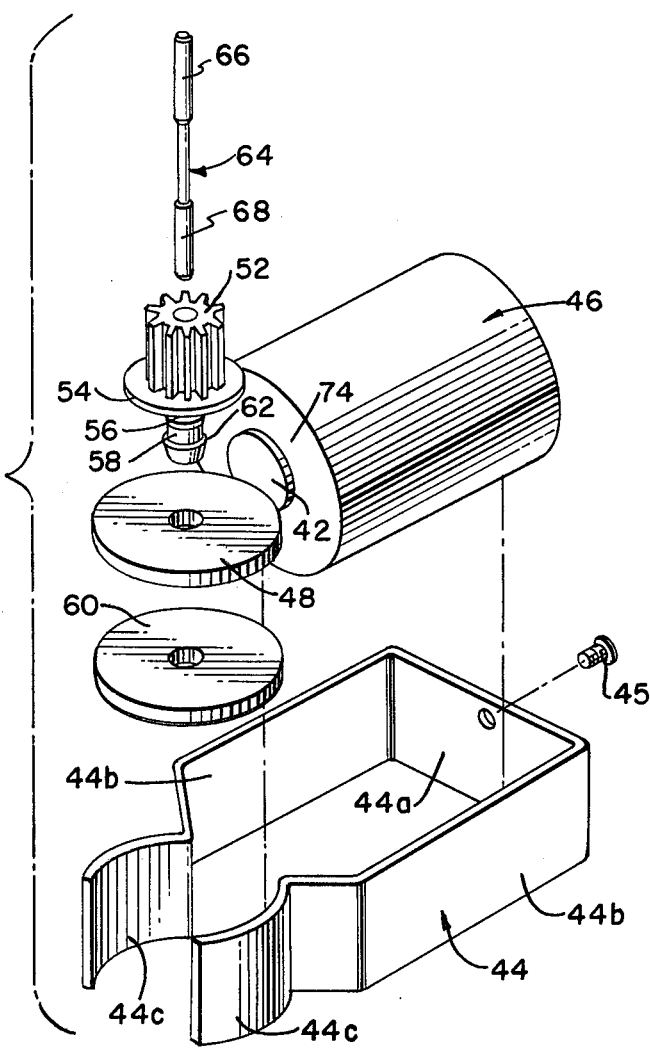
FIG. 6 is an exploded perspective view of the motor of FIG. 3.

A mounting member 50 serves to support the rotor for movement. Turning to FIG. 4, the mounting member is of onepiece construction, preferably molded, having a pinion 52 at one end and a pair of mounting surfaces at the other end. A flange 54 extends outwardly of the mounting member below the pinion providing a surface against which the upper surface of the rotor may be disposed. A first mounting surface 56 supports the rotor 48 below the flange and a second mounting surface 58, connected to the first by an outwardly inclined surface, supports an inertia weight 60. The inertia weight substantially is immobilized axially between the incline surface and a shoulder 62. The rotor is received through a friction fit or otherwise on the first mounting surface so that the rotor and pinion move conjointly.

As is known, the inertia weight serves to assist in starting of the motor. If a starting spin is required to start the motor difficulty in starting may be experienced unless the magnitude of the spin substantially is equal to that of the magnitude of the output drive of the motor. For example, if the starting spin is of a magnitude above the motor speed, say of 2000 rpm, the drop in speed to the magnitude of the speed of the motor and beyond may be very fast so that the motor may not start. The inertia weight, on the other hand, tends to level out the drop in the speed of the initial spin so that the motor has a significantly better opporturnity of starting. The inertia weight may be formed by a brass ring of a diameter substantially equal to that of the magnet.

A shaft 64 is provided for mounting the mounting member 50. The shaft is of elongated length including a portion of reduced diameter between a pair of ends 66 and 68. The mounting member 50 may be slidably received on the shaft and is freely rotatable relative to the shaft. The shaft may be formed of carbon steel with smooth ends thereby to reduce the amount of friction of rotation of the mounting member 50. The portion may be relieved by about 0.002 to 0.004 inches in diameter and serves as a reservoir for a volume of lubricating oil.

Figure 7:
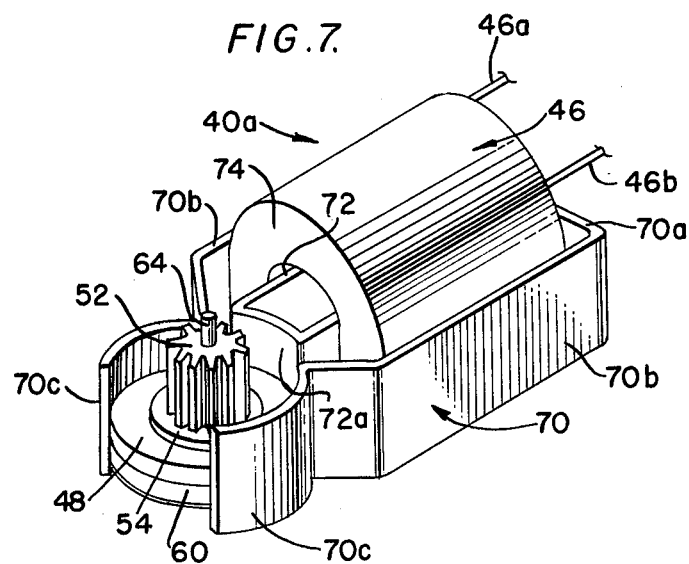
FIG. 7 is a view similar to FIG. 5 yet illustrating a slightly modified motor construction.
Figure 8:
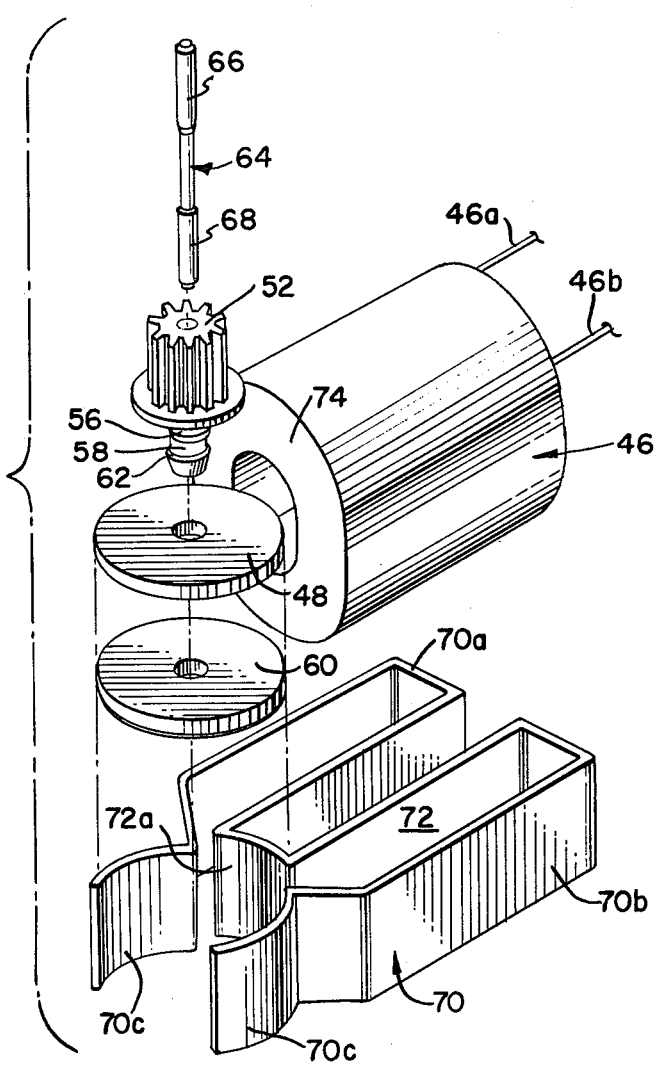
FIG. 8 is an exploded perspective view of the motor of FIG. 7.

A slight modification of the D.C motor of FIG. 3 is illustrated in FIGS. 7 and 8. The modified motor 40a includes an integral stator 70 and core 72. The core 72 provides a support for the winding 46 which through a plurality of turns surrounds the core in the area between the legs 70b and extends from the base 70a toward the rotor 48. As in the form of motor of FIGS. 3–6, the end 72a of core 72 is disposed from the periphery of the rotor through a distance of about 0.010 inches. The end 72a of core 72 may be disposed along an arc substantially concentric with the pole faces 70c and the shaft. A washer 74 formed of a phenolic paper is received over the core 72 (and the core 42) to support the winding 46. The winding is covered with a tape outer wrap 75. The form of core of FIG. 3 is preferred since the solid core provides a denser flux field.

Figure 9:
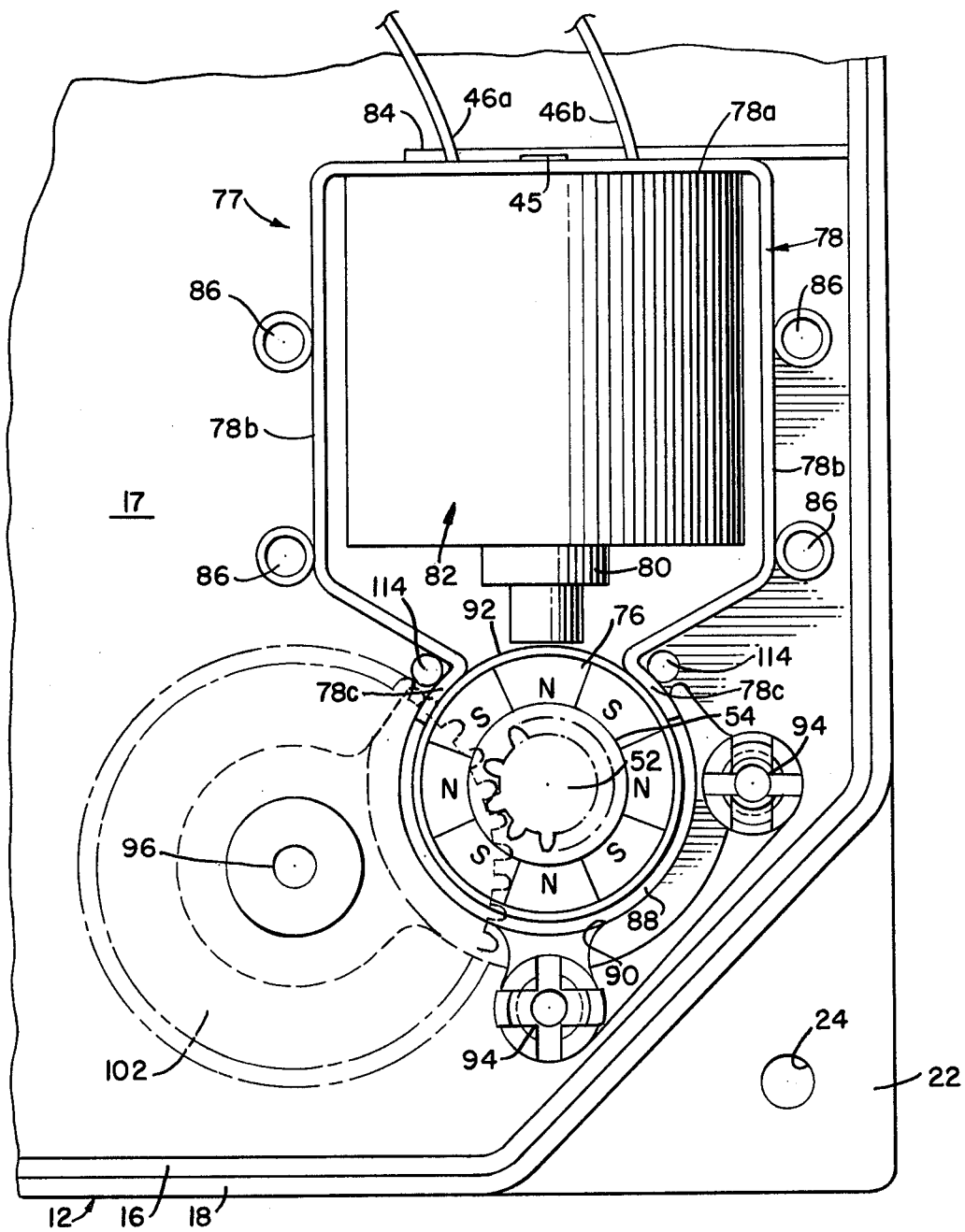
FIG. 9 is a view similar to FIG. 3 illustrating a second form of the motor of the present invention.

The second form of motor 77 of the present invention may be seen in FIG. 9 wherein structure similar to that of FIG. 3 is represented by the same numeral designation.

The second form of motor is an A.C. motor and derives power from a 60 Hz alternating current source. The frequency of the source is twice that for the D.C. motor and to provide an output drive which is the same as that of the D.C. motor the rotor 76 includes a plurality of eight North-South poles arranged around the shaft 64. The rotor is permanently magnetized radially and each of the poles has a magnetic working area of about 45°. The motor also includes a stator 78, a core 80 and a winding 82, as heretofore described. While the base 78a and legs 78b of stator 78 are similar to the structure of stator 44 of FIG. 3, the pole faces 78c are of an arcuate length less than the length of the poles faces 44c of the stator of FIG. 3 thereby to cooperate with the poles of rotor 76 having a shorter magnetic working area. The stator poles 78c may be about 30° in length. The length may be determined from the stated parameters i.e., the diameter of the rotor and the size of the air gap, heretofore described. As illustrated in FIG. 9, the stator poles 78c are spaced apart by an angle of approximately 90° and each stator pole is spaced apart from the end of core 80 facing the rotor 76 by an angle of approximately 45°. The diameter of core 80 at the air gap will be substantially equal to the length of the stator poles and spaced from the rotor by a distance substantially equal to the spacing of the stator poles. As heretofore described, the spacing is about 0.010 inches.

In the several forms of the motor of the present invention the width of the stator poles may be about 0.328 inches. The large surface area of the stator poles assists in reducing the criticality of rotor positioning along the length of shaft 64.

Referring now to FIGS. 2, 3 and 9, as an important aspect of the invention the front and back plates each are molded in one-piece to provide support and securement for the motor, the oscillator (in the D.C. form of motor) and the mechanical drive components of the clock.

A wall 84, at least a pair of posts 86 and a pair of slots 88 provide support for the stator 44 (and stators 70 and 78) on the base 17. Particularly, the wall 84 extends inwardly from the wall 16 providing a surface against which the stator base 44a (and bases 70a and 78a) is juxtaposed, while the posts extend upwardly from the base 17 and support the stator legs 44b (and legs 70b and 78b) therebetween. The slots 88 are formed between a wall 90 and a wall of boss 92 disposed concentrically about the axis of the boss. Both of the walls are upstanding from the base 17. The slots position pole faces 44c (and pole faces and 70c and 78c) of stator 44 ( and stators 70 and 78) and determine the size of the air gap between the poles faces of the stator and the workng faces of rotor 48 (and rotor 76). The slots and the axis of the boss reduce substantially the critical adjustment radially of the rotor location within the field of the stator. The width of the slot 88 is slightly greater than the thickness of the stator for ease in positioning of the stator whose pole faces tend to move radially outwardly into juxtaposed relation with the wall 90. A pair of tabe (not shown) supported by the back plate 14 may be employed for retaining the axial disposition of the stator relative to the base 17. The tabs for this purpose move into position with the edges of the legs 44b (and legs 70b and 78b) preferably about in the center of the legs when the plates are joined together.

The shaft 64 is supported stationarily along the axis of the boss 92 and the mounting member 50 is slidably received thereon. A bridge (not shown) of sector-shaped outline is supported by a pair of bridge pillars 94 arranged around the axis of shaft 64. The bridge includes a bore at the reduced end into which the other end of the shaft is received. Thus, the shaft will be stabilized against movement.

Additionally, a plurality of pillars 96, 98 and 100 including a pedestal portion and a mounting shaft extend upwardly of the base 17 for supporting the first, second and third reduction wheels, respectively. The reduction wheels are immobilized axially between the pedestals and the undersurfaces of the frustoconical recesses 104, 106 and 108 in the back plate 14. The shafts of the pillars 96, 98 and 100 are closely disposed to the undersurfaces. The first reduction wheel 102 is illustrated in driven engagement with the pinion 52. The other wheels are not shown.

The casing 10 is mounted to the back of the face of the clock by means of a pair of screws received through the apertures 24. the main shaft communicates through the aperture 110 in the front plate 12. Means on the underside of the back plate 14 also supports one end of the main shaft against axial movement.

The pads 112 (only two are shown) support a printed circuit board and quartz crystal (not shown) on the base 17 for use in the D.C. adaptation of motor of the present invention.

The casing 10 is adapted for use in both adaptations of motor of the present invention with only slight modifications, as described. Insofar as the support for the stator 78, however, of the A.C. motor 77 the base 17 includes a further pair of stator posts 114 which support one side of th pole faces 78c. The stator posts are used for increased support since the pole faces are of a reduced length and only slightly enter into the slot 88.

Having described the invention with particular reference to the preferred form thereof, it will be obvious to those skilled in the art to which the invention pertains after understanding the invention, the various changes and modifications may be made therein without departing from the spirit and scope of the invention as defined by the claims appended hereto.

Having described the invention what is claimed is:

1. A synchronous motor comprisng:

(a) a rotor of disc-shaped outline, said rotor having a plurality of permanently magnetized portions disposed in contiguous alternating fashion around an axis of rotation;
(b) a single-piece stator, said stator having a pair of legs defining at opposite ends a pair of stator poles, said poles being arcuate in outline, disposed substantially coaxially along said axis at an air gap, and spaced apart by an angle of between about 90° and 180°;
(c) a coil assembly including
 (2) an elongated core having one end directed toward and located substantially at said air gap, said core end providing a core pole disposed substantially equidistantly from said stator poles, and
 (2) a winding having a plurality of turns supported by said core, said winding adapted at opposite ends to be connected to means providing a source of current; and
(d) means mounting said rotor in said air gap and said stator to the other end of said core whereby said current source develops an energizing flux field across said air gap between said poles for driving said rotor.

2. The synchronous motor of claim 1 wherein said portions are radially magnetized.

3. The synchronous motor of claim 2 wherein said poles are substantially equal in length and less than the length of said radially magnetized portions at said air gap.

4. The synchronous motor of claim 2 wherein said means providing a source of alternating current includes a substantially constant source of oscillation, a power cell, and a plurality of serially arranged counter means.

5. The synchronous motor of claim 2 wherein said means providing a source of alternating current includes the alternating current power mains.

6. A synchronous motor comprising:
(a) a rotor of disc-shaped outline, said rotor having a plurality of permanently magnetized portions disposed in contiguous alternating fashion around an axis of rotation;
(b) a stator, said stator having a pair of legs defining at the ends a pair of stator poles, said poles being arcuate in outline and substantially coaxial along said axis at an air gap;
(c) a coil assembly including
 (1) an elongated core having one end directed toward and located substantially at said air gap, said core end providing a core pole, and
 (2) a winding having a plurality of turns supported by said core, said winding adapted at opposite ends to be connected to means providing a source of alternating current and,
(d) means mounting said rotor in said air gap, and wherein said stator and said core are of unitary construction and said legs extend from the other end of said core whereby said current source develops in an alternating energizing flux field across said air gap between said poles for driving said rotor.

7. The synchronous motor of claim 6 wherein said core pole is arcuate in outline and coaxial with said stator poles.

8. A synchronous motor comprising:
(a) a rotor of disc-shaped outline, said rotor having a plurality of permanently magnetized poles of alternating polarity disposed substantially equi-angularly around an axis of rotation;
(b) a single piece-stator, said stator having a pair of legs defining at the ends a pair of stator poles, said poles being arcuate in outline and substantially coaxial along said axis at an air gap;
(c) a coil assembly including
 (1) an elongated core having one end directed toward and located substantially at said air gap, said core end providing a core pole, and
 (2) a winding having a plurality of turns supported by said core, said winding adapted at opposite ends to be connected to means providing a source of current;
(d) means mounting said rotor in said air gap, said means including a circular upstanding boss; and
(e) means mounting said stator at said air gap and to the other end of said core whereby said current source develops an alternating energizing flux circuit for driving said rotor, said means for mounting said stator including an upstanding wall disposed substantially around and concentric with said boss portion with said stator poles being supported in a slot therebetween.

9. The synchronous motor of claim 8 wherein the poles are disposed contiguous fashion around said axis of rotation.

10. A synchronous motor comprising:
(a) a rotor of disc-shaped outline, said rotor having a plurality of permanently magnetized portions disposed in contiguous alternating fashion around an axis of rotation;
(b) a coil assembly including
 (1) an elongated core having one end directed toward said axis of rotation and located substantially at an air gap, said core end providing a core pole, and
 (2) a winding having a plurality of turns supported by said core, said winding adapted at opposite ends to be connected to means providing a source of alternating current;
(c) a stator having a single leg with a stator pole of substantially arcuate outline at one end;
(d) means mounting the other end of said stator leg to the other end of said core whereby said current source develops an alternating energizing flux field across said air gap between said stator pole and said core pole for driving said rotor;
(e) means for mounting said rotor in said air gap including
 (1) a circular upstanding bars, and
 (2) a shaft supported by said bars coaxial with said axis of rotation, said rotor being received on said shaft; and,
(f) means for locating the arcuate end of said stator leg at said air gap, said locating means formed by an upstanding wall disposed around and concentric with said hub substantially from one side of said core pole to the other to define a slot between said wall and bars, and said arcuate end of said stator leg being supported in said slot.

11. The motor of claim 10 wherein said stator pole an core pole are spaced apart by an angle of about 90°.

12. The motor of claim 10 including in combination a molded housing, said casing enclosing said motor, and said upstanding bars and wall being an integral molded part of said casing.

13. A synchronous motor comprising:
(a) a rotor of disc-shaped outline, said rotor having a plurality of permanently magnetized portions disposed in contiguous alternating fashion around an axis of rotation;
(b) a single-piece stator, said stator having a pair of legs defining a pair of stator poles at opposite ends, said poles being arcuate in outline and substantially coaxial along said axis at an air gap;
(c) a coil assembly including:
  (1) an elongated core which together with said stator are unitary in construction having one end directed toward and located substantially at said air gap, said core end providing a core pole, and
  (2) a winding having a plurality of turns supported by said core, said winding adapted at opposite ends to be connected to means providing a source of alternting current; and,
(d) means mounting said rotor in said air gap, said mounting means including a base portion to which said legs are connected whereby said current source develops an energizing flux field across said air gap between said poles for driving said rotor.

14. A synchronous motor comprising:
(a) a casing providing support for said motor including:
  (1) a base,
  (2) a circular bars extending upwardly from said base, and
  (3) a wall disposed substantially around and concentric with said bars to define a slot therebetween;
(b) a rotor of disc-shaped outline, said rotor having a plurality of permanently radially magnetized portions disposed in contiguous alternating fashion around an axis of rotation,
(c) a single-piece stator having a pair of legs defining a pair of stator poles at opposite ends, said poles being arcuate in outline, disposed substantially coaxially along said axis at an air gap, spaced apart by an angle of about 90° and about 180°, and supported in said slot;
(d) a coil assembly including
  (1) an elongated core having one end directed toward and located substantialy at said air gap, said core end providng a core pole, and
  (2) a winding having a plurality of turns supported by said core, said winding adapted at opposite ends to be connected to means providing a source of alternating current;
(e) means mounting said rotor in said air gap, said mounting means comprising a shaft by said bars, said rotor being slidably received on said shaft; and,
(f) means mounting said stator to the other end of said core whereby said current source develops an alternating energizing flux field across said air gap between said poles for driving said rotor.

15. The combination of claim 14 wherein said means mounting said rotor further includes:
(a) a mounting member, said mounting member having an elongated bore for receipt on said shaft and said rotor being supported on said mounting member for conjoint movement.

* * * * *

UNITED STATES PATENT AND TRADEMARK OFFICE
CERTIFICATE OF CORRECTION

PATENT NO. : 4,097,757
DATED : June 27, 1978
INVENTOR(S) : Anthony W. Rigazio

It is certified that error appears in the above–identified patent and that said Letters Patent are hereby corrected as shown below:

Column 6, line 15, "tabe" should be --tabs--
Column 6, line 44, "the" (second occurrence) should be --The--

Column 7, line 12, "(2)" should be --(1)--

Column 8, line 54, "bars" should be --boss--
Column 8, line 55, "bars" should be --boss--
Column 8, line 61, "hub" should be --boss--
Column 8, line 63, "bars" should be --boss--
Column 8, line 65, "an" should be --and--
Column 8, line 68, "housing" should be --casing--

Column 9, line 1, "bars" should be --boss--
Column 9, line 23, "alternting" should be --alternating--
Column 9, line 35, "bars" should be --boss--

Column 10, line 2, "bars" should be --boss--
Column 10, line 23, "bars" should be --boss--

Signed and Sealed this

Second Day of January 1979

[SEAL]

Attest:

RUTH C. MASON
Attesting Officer

DONALD W. BANNER
Commissioner of Patents and Trademarks